US008376006B2

(12) United States Patent
Tanno

(10) Patent No.: US 8,376,006 B2
(45) Date of Patent: Feb. 19, 2013

(54) TIRE NOISE REDUCTION DEVICE AND PNEUMATIC TIRE PROVIDED WITH THE SAME

(75) Inventor: Atsushi Tanno, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 343 days.

(21) Appl. No.: 12/877,813

(22) Filed: Sep. 8, 2010

(65) Prior Publication Data

US 2011/0061781 A1 Mar. 17, 2011

(30) Foreign Application Priority Data

Sep. 11, 2009 (JP) ................................ 2009-209976

(51) Int. Cl.
*B60C 19/00* (2006.01)

(52) U.S. Cl. ....................................... 152/155; 152/157

(58) Field of Classification Search .................. 152/155, 152/157, 158, 450

See application file for complete search history.

(56) References Cited

U.S. PATENT DOCUMENTS 6,244,314 B1 * 6/2001 Dodt et al. .................... 152/158
2009/0314403 A1 * 12/2009 Tanno ........................... 152/157
2010/0012243 A1 * 1/2010 Tanno et al. ................. 152/155

FOREIGN PATENT DOCUMENTS

JP 62-050203 3/1987
JP 2004-291855 10/2004
JP 2008-080846 4/2008
JP 2009-034924 2/2009
JP 2009-045747 3/2009

* cited by examiner

*Primary Examiner* — Justin R Fischer
*Assistant Examiner* — Robert Dye
(74) *Attorney, Agent, or Firm* — Thorpe North & Western LLP

(57) ABSTRACT

A tire noise reduction device including a noise absorbing member made from a porous material that is formed into a band, the band being disposed along a tire circumferential direction on an inner surface of a tread portion of a pneumatic tire, wherein the noise absorbing member is wound so as to be laminated with two layers or more on at least a part of the tire circumferential direction to form a circular body, a crossing section where an inside layer and an outside layer of the noise absorbing member interchange is provided in at least one location on a periphery of the circular body, and the ends of the longitudinal direction of the noise absorbing member are disposed inward of the outermost layer of the noise absorbing member.

20 Claims, 5 Drawing Sheets

5(6)
4
2
3
1

7
6X
4
5a
5b
51
53
5(6)
52
7
7

TIRE NOISE REDUCTION DEVICE AND PNEUMATIC TIRE PROVIDED WITH THE SAME

PRIORITY CLAIM

This application is based upon and claims the benefit of priority from Japanese Patent Application No. 2009-209976, filed Sep. 11, 2009, the entire contents of which is incorporated herein by reference.

BACKGROUND

1. Technical Field

The present invention is related to a device for reducing cavernous resonance generated in a pneumatic tire and a pneumatic tire provided with the same. More specifically, the present invention relates to a tire noise reduction device that makes both a reduction of manufacturing costs and an improvement of durability possible, and a pneumatic tire provided with the same.

2. Related Art

In pneumatic tires, cavernous resonance caused by the vibration of air that the tire is filled with is one cause of noise being generated. When a tire is rolled, uneven road surfaces cause a tread portion to vibrate. The vibrations of the tread portion cause the air inside the tire to vibrate which causes cavernous resonance to be generated.

Providing a noise absorbing member made from a porous material on an entire circumference of an inner surface of the tread portion of a pneumatic tire has been proposed as a technique for reducing noise caused by cavernous resonance.

When the noise absorbing member made from the porous material is formed into a band and this noise absorbing member band is disposed along the inner surface of the tread portion of a pneumatic tire, at least one of the ends thereof comes in direct contact with a tire inside surface. For example, when both ends of the noise absorbing member band are butted against each other, both ends come in direct contact with the tire inside surface. Additionally, when both ends of the noise absorbing member band are overlapped, one of the ends comes in direct contact with the tire inside surface. When such an end of such a noise absorbing member band is in contact with the tire inside surface, the end of the noise absorbing member rubs against the tire inside surface during tire rotation. Therefore, a problem exists in that the noise absorbing member is prone to damage starting at this area where the noise absorbing member rubs against the tire inside surface.

On the other hand, it is possible to form an annular noise absorbing member that does not have ends in a tire circumferential direction in place of the noise absorbing member band. There is merit in this case in that the noise absorbing member is not easily damaged. However, it is necessary to form such an annular noise absorbing member for each tire size. Therefore, there is a problem in that the manufacturing costs of the tire noise reduction device will increase significantly.

An object of the present invention is to provide a tire noise reduction device that makes both a reduction of manufacturing costs and an improvement of durability possible, and a pneumatic tire provided with the same.

SUMMARY

In order to achieve the aforementioned object, the present invention provides a tire noise reduction device including a noise absorbing member made from a porous material that is formed into a band, the band being disposed along a tire circumferential direction on an inner surface of a tread portion of a pneumatic tire, wherein the noise absorbing member is wound so as to be laminated with two layers or more on at least a part of the tire circumferential direction to form a circular body, a crossing section where an inside layer and an outside layer of the noise absorbing member interchange is provided in at least one location on a periphery of the circular body, and ends of a longitudinal direction of the noise absorbing member are disposed inward of the outermost layer of the noise absorbing member.

Additionally, in order to achieve the aforementioned object, a pneumatic tire of the present invention is provided with the tire noise reduction device in a cavity portion thereof.

In the present invention, ends of a noise absorbing member do not directly contact a tire inside surface due to a noise absorbing member being wound so as to extend along a tire circumferential direction on an inner surface of a tread portion of a pneumatic tire, thereby forming a circular body, wherein a crossing section where an inside layer and an outside layer of the noise absorbing member interchange is provided in at least one location on a periphery of the circular body, and the ends of the noise absorbing member are disposed inward of the outermost layer of the noise absorbing member. As a result, the noise absorbing member is not easily damaged due to rubbing with the tire inside surface. Therefore, durability of the tire noise reduction device can be improved.

Moreover, with the present invention, the tire noise reduction device can be applied to a variety of tire sizes by adjusting a peripheral length of the circular body obtained through winding due to using a noise absorbing member band as the tire noise reduction device. Therefore, manufacturing costs of the tire noise reduction device can be significantly reduced compared to when using noise absorbing members that are formed into a circular shape.

In the present invention, it is preferable that a pair of narrow width sections having a reduced size in a width direction are formed in a position corresponding to the crossing section of the noise absorbing member, and, in the crossing section, the pair of narrow width sections are disposed in positions mutually displaced in the width direction of the noise absorbing member. Thereby, the inside layer and the outside layer of the noise absorbing member can interchange smoothly in the crossing section.

It is preferable that a width Da of a first narrow width section and a width Db of a second narrow width section of the pair of narrow width sections in relation to a maximum width D of the noise absorbing member satisfy $0.7 \leqq (Da+Db)/D \leqq 1.0$. Additionally, it is preferable that the width Da of the first narrow width section and the width Db of the second narrow width section of the pair of narrow width sections satisfy $0.8 \leqq Da/Db \leqq 1.2$. Thereby, the durability of the tire noise reduction device can be well maintained, and, at the same time, the inside layer and the outside layer of the noise absorbing member can interchange smoothly in the crossing section.

It is preferable that linear sections extending parallel to the longitudinal direction of the noise absorbing member are provided at positions mutually opposite the pair of narrow width sections, and a length of the linear sections is from 3 times to 30 times a thickness of the noise absorbing member. By sufficiently ensuring the length of the linear sections, a range of adjustability of the peripheral length of the circular body can be enlarged, and a common noise absorbing member can be applied to a wider range of tire sizes. Additionally, it is preferable that an outer peripheral length of the circular body is from 85% to 99% of a maximum inner peripheral length of the tread portion of the pneumatic tire. Thereby, an improvement effect of the durability of the tire noise reduction device can be increased.

The laminated plurality of layers of the noise absorbing member can be mutually secured using fasteners. In this case, it is preferable that a thickness at the fasteners when in a secured state is from 5% to 95% of a total thickness of the laminated plurality of layers. Thereby, an improvement effect of the durability of the tire noise reduction device can be increased. Additionally, the laminated plurality of layers of the noise absorbing member can be mutually adhered. In this case, while processing costs are higher compared to when using the fasteners, durability is improved.

It is preferable that when the circular body is divided at 30 degree intervals from an arbitrary position on the periphery, a difference in mass of a pair of opposing divisions on either side of a center axis of the circular body is 10% or less with respect to a mass of a heavier division thereof. Thereby, unbalances in mass caused by the tire noise reduction device can be reduced.

It is preferable that a density of the porous material forming the noise absorbing member is from 7 kg/m$^3$ to 40 kg/m$^3$, and a ratio of a tear strength (N/cm) to the density (kg/m$^3$) of the porous material is from 0.3 to 0.9. Thereby, an improvement effect of the durability of the tire noise reduction device can be increased.

DETAILED DESCRIPTION

Figure 1:
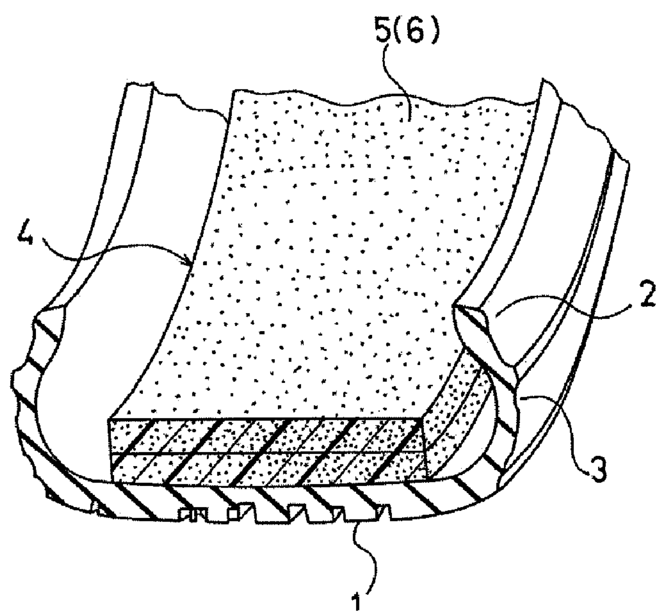
FIG. 1 is a perspective cross-sectional view showing a pneumatic tire according to an embodiment of the present invention.
Figure 2:
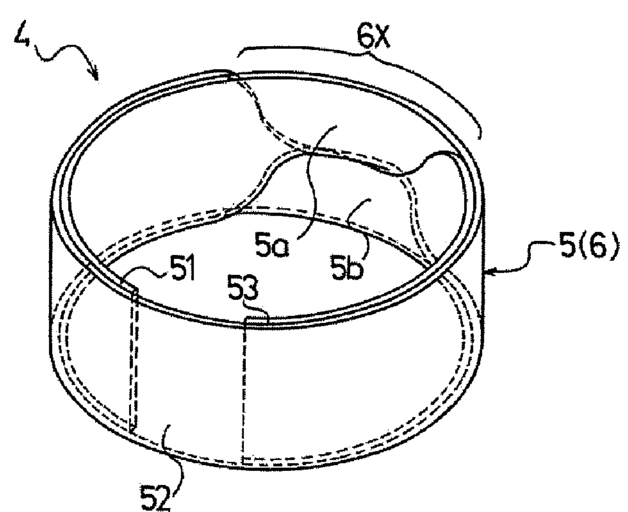
FIG. 2 is a perspective view showing a tire noise reduction device according to an embodiment of the present invention.
Figure 3:
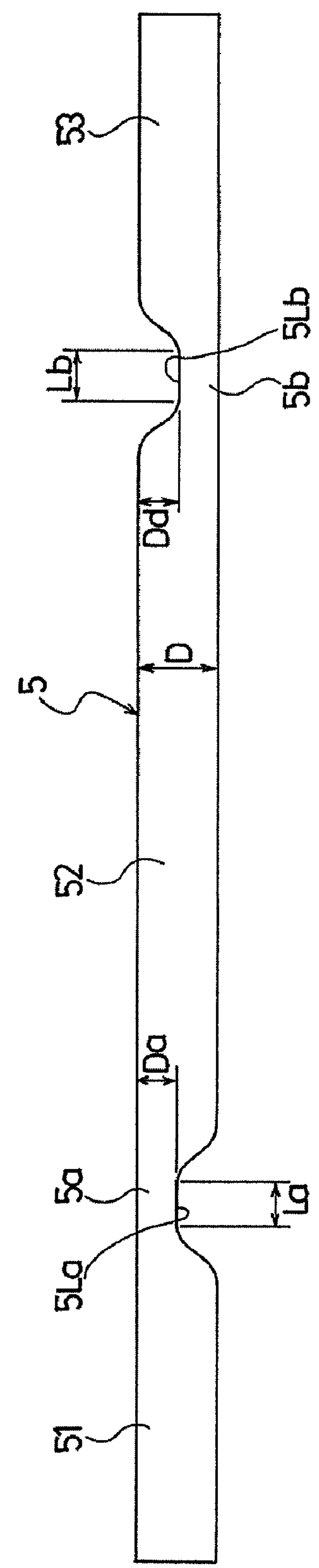
FIG. 3 is a plan view showing a noise absorbing member band for use in the tire noise reduction device of FIG. 2.

Detailed descriptions will be given below of a configuration of the present invention with reference to the accompanying drawings. FIG. 1 shows a pneumatic tire according to an embodiment of the present invention. FIG. 2, shows a tire noise reduction device according to an embodiment of the present invention. FIG. 3 shows a noise absorbing member band for use in the tire noise reduction device of FIG. 2. In FIG. 1, the pneumatic tire is provided with a tread portion 1, a pair of left-right bead portions 2, and sidewall portions 3 that mutually connect the tread portion 1 and the bead portions 2. Additionally, a tire noise reduction device 4 shown in FIG. 2 is installed on an inner surface of the tread portion 1.

The tire noise reduction device 4 is formed from a circular body 6 that is formed by winding a noise absorbing member 5, that is made from a porous material and formed into a band, so that two layers or more are laminated on at least a part of the tire circumferential direction. Urethane foam having interconnecting cells is preferably used as the porous material of the noise absorbing member 5. Additionally, the noise absorbing member 5 is preferably an integrated member, but it may be a plurality of members that are joined together.

As shown in FIG. 2, a crossing section 6X, where an inside layer and an outside layer of the noise absorbing member 5 interchange, is provided in at least one location on a periphery of the circular body 6. As a result of the inside layer and the outside layer of the noise absorbing member 5 that is wound in this way interchanging via the crossing section 6X, ends 51,53 of a longitudinal direction of the noise absorbing member 5 are disposed inward of an outermost layer of the noise absorbing member 5. As shown in the drawings, the ends 51,53 of the noise absorbing member 5 may be separated from each other. It is also possible to dispose the ends 51,53 so as to be butted against each other or dispose the ends 51,53 so as to overlap each other.

As shown in FIG. 3, a pair of narrow width sections 5*a*,5*b* having a reduced size in a width direction are formed in a position corresponding to the crossing section 6X of the noise absorbing member 5. Specifically, the noise absorbing member 5 is provided with the narrow width section 5*a* between the first end 51 and a center portion 52, and the narrow width section 5*b* between the center portion 52 and the second end 53. In the crossing section 6X of the circular body 6, the pair of narrow width sections 5*a*,5*b* are disposed in positions mutually displaced in the width direction of the noise absorbing member 5. Therefore, the inside layer and the outside layer of the noise absorbing member 5 can interchange smoothly without interfering with each other in the crossing section 6X.

The crossing section 6X can be provided at a plurality of locations in the circular body 6, but if a number of the provided locations is even, one of the ends 51,53 will end up on the outermost layer of the noise absorbing member 5. Therefore, an odd number of the crossing section 6X is provided in the circular body 6.

With the tire noise reduction device 4 as described above, the noise absorbing member 5 is wound so as to form the circular body 6, the crossing section 6X where an inside layer and an outside layer of the noise absorbing member 5 interchange is provided in at least one location on the periphery of the circular body 6, and the ends 51,53 of the noise absorbing member 5 are disposed inward of the outermost layer of the noise absorbing member 5. Therefore, the ends 51,53 of the noise absorbing member 5 cease to come in direct contact with the tire inside surface. As a result, damage to the noise absorbing member 5 due to rubbing on the tire inside surface can be prevented and durability of the tire noise reduction device 4 can be improved.

Moreover, because the noise absorbing member 5 used in the tire noise reduction device 4 is a band, the peripheral length of the circular body 6 can be adjusted as desired based on a winding condition of the noise absorbing member 5 and can be applied to various sizes of tires. Therefore, manufacturing costs of the tire noise reduction device 4 can be significantly reduced compared to when using noise absorbing members that are formed into a circular shape.

In the tire noise reduction device 4 described above, a width Da of a first narrow width section 5*a* and a width Db of a second narrow width section 5*b* in relation to a maximum width D of the noise absorbing member 5 preferably satisfy $0.7 \leqq (Da+Db)/D \leqq 1.0$ and more preferably satisfy $0.75 \leqq (Da+Db)/D \leqq 0.98$. When these relationships are satisfied, the durability of the tire noise reduction device 4 can be well maintained, and, at the same time, the inside layer and the outside layer of the noise absorbing member 5 can interchange smoothly in the crossing section 6X. If a value for (Da+Db)/D is too large, durability will decrease due to the narrow width sections 5*a*,5*b* contacting each other. On the other hand, if the value is too small durability will decrease due to a localized drop in the strength of the noise absorbing member 5.

Additionally, the width Da of the first narrow width section 5*a* and the width Db of the second narrow width section 5*b* preferably satisfy $0.8 \leqq Da/Db \leqq 1.2$ and more preferably satisfy Da/Db=1.0. When these relationships are satisfied, the durability of the tire noise reduction device 4 can be well maintained, and, at the same time, the inside layer and the outside layer of the noise absorbing member 5 can interchange smoothly in the crossing section 6X. If the value of Da/Db is not within the abovementioned ranges, durability will decrease due to an increase in a difference in strength in the pair of narrow width sections 5*a*,5*b*.

As shown in FIG. 3, linear sections 5La,5Lb extending parallel to the longitudinal direction of the noise absorbing member 5 are provided, respectively, at positions opposite each of the pair of narrow width sections 5*a*,5*b*. A length La,Lb of the linear sections 5La,5Lb is preferably from 3 times to 30 times a thickness of the noise absorbing member 5. By sufficiently ensuring the length La,Lb of the linear sections 5La,5Lb, a range of adjustability of the peripheral length of the circular body 6 can be enlarged, and a common noise absorbing member 5 can be applied to a wider range of tire sizes. If the length La,Lb is less than 3 times the thickness of the noise absorbing member 5, durability will decrease due to an increase in an amount of deformation of the narrow width sections 5*a*,5*b*. On the other hand, if the length exceeds 30 times, an unbalance of mass will occur due to an increase in a mass insufficiency in the crossing section 6X, and durability will decrease due to a drop in the integrity of the circular body 6.

The outer peripheral length of the circular body 6 can be adjusted based on a winding condition of the noise absorbing member 5, but is preferably from 85% to 99% and more preferably from 90% to 98% of a maximum inner peripheral length (inner peripheral length at a tire equator position) of the tread portion 1 of the pneumatic tire. When the outer peripheral length is in the ranges described above, an improvement effect of the durability of the tire noise reduction device 4 can be increased. If the outer peripheral length of the circular body 6 is too small, durability will decrease due to the tire noise reduction device 4 shifting easily and rubbing easily during tire rotation. On the other hand, if the outer peripheral length is too large, durability will decrease due to the noise absorbing member 5 being excessively compressed.

In the tire noise reduction device 4, it is preferable that securing means such as fasteners or adhesives are used to mutually secure the laminated plurality of layers of the noise absorbing member 5 to ensure a shape stability of the circular body 6 and to increase the durability improvement effect of the tire noise reduction device 4.

When mutually adhering the laminated plurality of layers of the noise absorbing member 5, it is preferable that adhesion is performed at least partially between the layers. Examples of adhesives that can be used include general adhesives that can adhere porous materials such as urethane foam via a chemical reaction, and hot melt adhesives produced from fusable resin. Though processing costs are high when the laminated plurality of layers of the noise absorbing member 5 are mutually adhered, there is a merit in that durability is high.

On the other hand, examples of fasteners that can be used when the laminated plurality of layers of the noise absorbing member 5 are secured using fasteners include eyelets, staples, pins, hooks, surface fasteners, and the like. Positions, numbers, and spacing of the fasteners can be selected as necessary depending on the durability and shape of the noise absorbing member 5. Additionally, the fasteners are preferably placed while taking a mass balance of the circular body 6 into consideration. When the laminated plurality of layers of the noise absorbing member 5 are mutually secured using fasteners, there is a merit in that processing costs are low.

Figure 4:
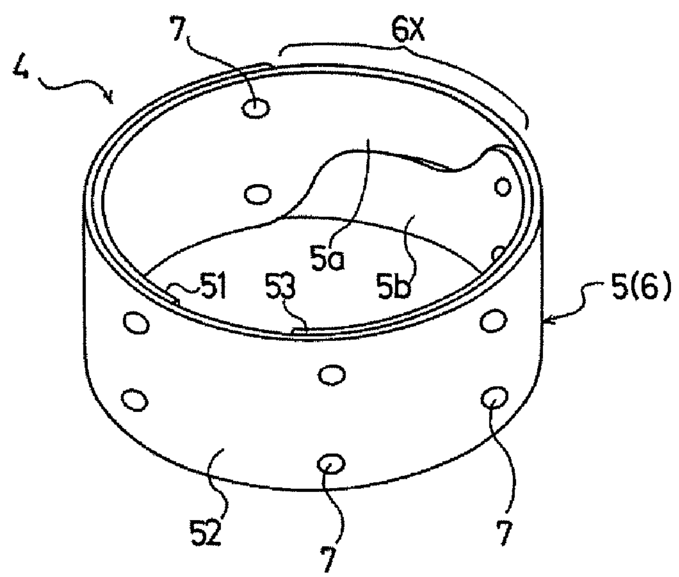
FIG. 4 is a perspective view showing a tire noise reduction device according to another embodiment of the present invention.
Figure 5:
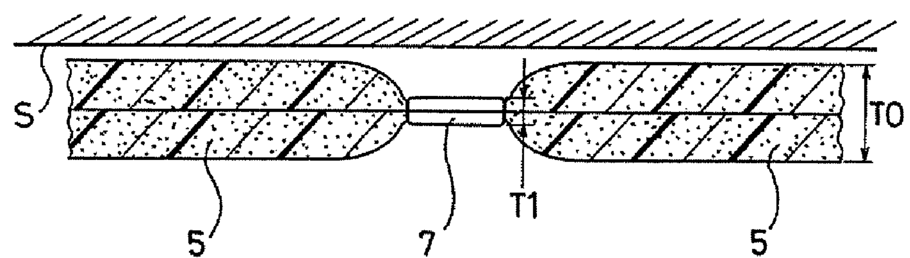
FIG. 5 is a cross-sectional view showing the main parts of the tire noise reduction device of FIG. 4.

FIG. 4 shows a tire noise reduction device according to another embodiment of the present invention. FIG. 5 is a drawing showing the main parts of the tire noise reduction device of FIG. 4. In FIG. 4 and FIG. 5, components which are the same as those shown in FIG. 2 will be denoted by the same reference numerals. Detailed descriptions for these components will be omitted. In FIG. 4, the laminated plurality of layers of the noise absorbing member 5 are mutually secured using a plurality of fasteners consisting of eyelets (cylindrical rivets) 7. The durability of the tire noise reduction device 4 can be further improved by mutually securing the laminated plurality of layers of the noise absorbing member 5 using the fasteners consisting of the eyelets 7.

As shown in FIG. 5, a thickness T1 at the fasteners consisting of the eyelets 7 when in a secured state is preferably from 5% to 95% and more preferably from 5% to 80% of a total thickness T0 of the laminated plurality of layers. By providing the thickness T1 in the above range, the fasteners will not contact the tire inside surface S, thus being beneficial to durability. If the thickness T1 is too great, the fasteners will easily contact the tire inside surface S, thus causing a drop in durability.

Figure 6:
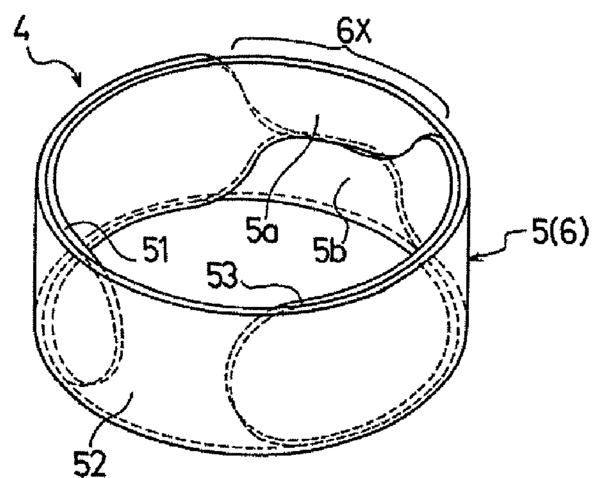
FIG. 6 is a perspective view showing a tire noise reduction device according to yet another embodiment of the present invention.
Figure 7:
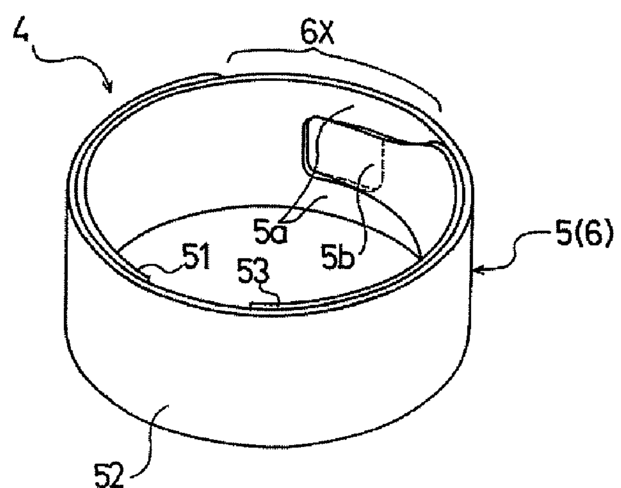
FIG. 7 is a perspective view showing a tire noise reduction device according to yet another embodiment of the present invention.
Figure 8:
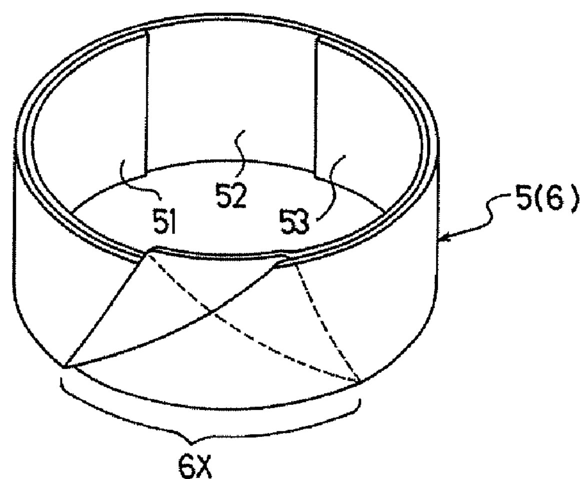
FIG. 8 is a perspective view showing a tire noise reduction device according to yet another embodiment of the present invention.

FIG. 6 to FIG. 8 each show tire noise reduction devices according to yet other embodiments of the present invention. In FIG. 6 to FIG. 8, components which are the same as those shown in FIG. 2 will be denoted by the same reference numerals. Detailed descriptions for these components will be omitted. In FIG. 6, the ends 51,53 of the noise absorbing member band 5 are formed into arcs. In this way, the ends 51,53 of the noise absorbing member 5 can be formed into a variety of shapes. For example, chamfering can be performed such as cutting off right angle corners of the ends 51,53 diagonally.

In FIG. 7, a pair of narrow width sections 5*a*,5*b* having a reduced size in a width direction are formed in a position corresponding to the crossing section 6X of the noise absorbing member 5, but the first narrow width section 5*a* is divided in the width direction of the noise absorbing member 5 so as to form two strips. The two strips of the first narrow width section 5*a* are disposed on both edges in the width direction of the noise absorbing member 5, and the second narrow width section 5*b* is disposed in a center region in the width direction of the noise absorbing member 5. In other words, a slot is formed between the two strips of the first narrow width section 5*a* in the noise absorbing member 5, and the second narrow width section 5*b* is inserted into that slot. As long as the noise absorbing member 5 is flexible, such a configuration is possible.

In FIG. 8, the noise absorbing member 5 does not have narrow width sections. In other words, the noise absorbing member 5 is a band with a uniform width. The noise absorbing member 5 is wound so as to be laminated with two layers or more on at least a part in the tire circumferential direction to form a circular body 6, but in a case of simply winding the noise absorbing member 5, one of the ends 51,53 becomes the inside layer and the other end becomes the outside layer. Therefore, in the crossing section 6X, by folding the noise absorbing member 5 up and then folding down the end of the ends 51,53 that has become the outside layer so that it becomes the inside layer, both of the ends 51,53 of the noise absorbing member 5 will be disposed inward of the outermost layer of the noise absorbing member 5. In such a configuration, a crease is preferably provided beforehand in a folding portion of the noise absorbing member 5 in order to increase workability when forming the noise absorbing member 5 into the circular body 6.

Figure 9:
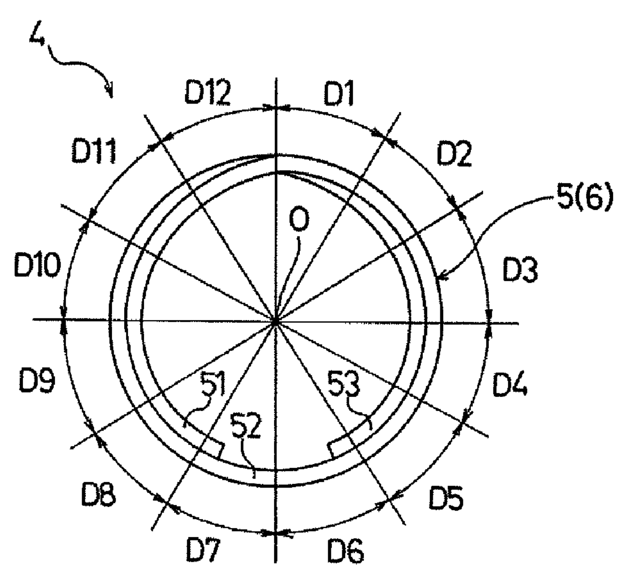
FIG. 9 is an explanatory diagram showing a mass distribution in the tire noise reduction device of the present invention.

FIG. 9 is an explanatory diagram showing a mass distribution in the tire noise reduction device of the present invention. In the aforementioned embodiments, the mass distribution of the tire noise reduction device is preferably uniform on the periphery. More specifically, as shown in FIG. 9, when the circular body 6 is divided at 30 degree intervals from an arbitrary position on the periphery into 12 divisions D1 to D12, a difference in mass of a pair of opposing divisions on either side of a center axis O of the circular body (for example, D1 and D7) is preferably 10% or less with respect to a mass of a heavier division thereof. When the difference in mass is as described above, unbalances in mass caused by the tire noise reduction device 4 can be reduced.

A mass adjustment region can be established in a position opposite to the crossing section 6X as a technique for reducing unbalances in mass of the tire noise reduction device 4. For example, as the mass of the noise absorbing member 5 lessens in the crossing section 6X of the circular body 6, lengths of the ends 51,53 of the noise absorbing member 5 are preferably adjusted so that an offsetting mass positioned opposite to the crossing section 6X compensates the mass of the noise absorbing member 5 at the crossing section 6X. Additionally, the width and the thickness of the noise absorbing member 5 may be reduced in the mass adjustment region. When fasteners are used, it is effective to adjust the positions, numbers, and spacing thereof.

In each of the aforementioned embodiments, a density of the porous material that forms the noise absorbing member 5 is preferably from 7 kg/m$^3$ to 40 kg/m$^3$. When the density of the porous material is within the aforementioned range, excellent sound absorbing properties are exhibited. Additionally, a ratio of a tear strength (N/cm) to the density (kg/m$^3$) of the porous material is preferably from 0.3 to 0.9. When the ratio of the tear strength (N/cm) to the density of the porous material is within the aforementioned range, the improvement effect of the durability of the tire noise reduction device 4 can be increased. Note that the density is "apparent density" measured in accordance with Japanese Industrial Standard (JIS) K7222. The tear strength is measured in accordance with JIS K6400-5 and is the tear strength of an uncut angled test sample.

Examples

Tire noise reduction devices for Examples 1 to 6 were manufactured, each configured with a noise absorbing member made from a porous material that is formed into a band, the band being disposed along a tire circumferential direction on an inner surface of a tread portion of a pneumatic tire, wherein the noise absorbing member is wound so as to be laminated with two layers on at least a part of the tire circumferential direction to form a circular body, a crossing section where an inside layer and an outside layer of the noise absorbing member interchange is provided at one location on a periphery of the circular body, and the ends of the longitudinal direction of the noise absorbing member are disposed inward of the outermost layer of the noise absorbing member. Furthermore, configurations of the circular body, securing means for between the layers of the noise absorbing member, densities of the porous material, and ratios of the tear strength to the density of the porous material were set as shown in Table 1.

In Examples 1 to 6, an outer peripheral length of the circular body was 95% of a maximum inner peripheral length of the tread portion of the pneumatic tire. For the configurations shown in FIG. 2 and FIG. 4, (Da+Db)/D=0.95 and Da/Db=1.0.

For comparison, a conventional tire noise reduction device was manufactured by making a circular body by winding a noise absorbing member, made from a porous material formed into a belt, two times along a tire circumferential direction and disposing one end of the noise absorbing member in a position that is in contact with a tire inside surface.

The tire noise reduction devices of the Conventional Example and of Examples 1 to 6 were each installed in pneumatic tires having tire sizes of 215/60R16. These pneumatic tires were then assembled on wheels having rim sizes of 16×6.5 J and mounted on a drum tester provided with a drum having a diameter of 1701 mm. Running tests were conducted under the following test conditions. Air pressure: 210 kPa, Load: 4.0 N, Speed: 81 km/h. Running distance until the noise absorbing member was damaged was measured. The evaluation results were expressed as an index with the conventional example being 100. Larger index values indicate superior durability.

TABLE 1

| | CE 1 | Ex. 1 | Ex. 2 | Ex. 3 | Ex. 4 | Ex. 5 | Ex. 6 |
|---|---|---|---|---|---|---|---|
| Circular body configuration | 2 wraps | FIG. 8 | FIG. 2 | FIG. 4 | FIG. 8 | FIG. 2 | FIG. 4 |
| Securing means for between the layers of the noise absorbing member | Adhesive | Adhesive | Adhesive | Eyelet | Adhesive | Adhesive | Eyelet |
| Density of the porous material (kg/m$^3$) | 6.5 | 6.5 | 6.5 | 6.5 | 25.0 | 25.0 | 25.0 |
| Tear strength (N/cm)/density (kg/m$^3$) | 0.25 | 0.25 | 0.25 | 0.25 | 0.35 | 0.35 | 0.37 |
| Durability (index) | 100 | 113 | 153 | 135 | 182 | 237 | 211 |

Notes to Table 1:

The abbreviations used in the column headings are as follows: "Ex." is an abbreviation of "Example"; and "CE" is an abbreviation of "Conventional Example"

As can be understood from Table 1, all of the tire noise reduction devices of Examples 1 to 6 exhibited superior durability compared to the Conventional Example. Of course, by adjusting the peripheral length of the circular body that is made by winding the noise absorbing member band, the tire noise reduction devices of Examples 1 to 6 can be applied to a variety of tire sizes. Therefore, they have versatility, and can be provided at a low cost.

What is claimed is:

1. A tire noise reduction device comprising:

a noise absorbing member made from a porous material that is formed into a band, the band being disposed along a tire circumferential direction on an inner surface of a tread portion of a pneumatic tire, wherein the noise absorbing member is wound so as to be laminated with two layers or more on at least a part of the tire circumferential direction to form a circular body;

a crossing section where an inside layer and an outside layer of the noise absorbing member interchange is provided in at least one location on a periphery of the circular body; and ends of a longitudinal direction of the noise absorbing member are disposed inward of an outermost layer of the noise absorbing member.

2. The tire noise reduction device according to claim 1, wherein a pair of narrow width sections having a reduced size in a width direction are formed in positions corresponding to the crossing section of the noise absorbing member, and, in the crossing section, the pair of narrow width sections are disposed in positions mutually displaced in the width direction of the noise absorbing member.

3. The tire noise reduction device according to claim 2, wherein a width Da of a first narrow width section and a width Db of a second narrow width section of the pair of narrow width sections in relation to a maximum width D of the noise absorbing member satisfy $0.7 \leqq (Da+Db)/D \leqq 1.0$.

4. The tire noise reduction device according to claim 3, wherein the width Da of the first narrow width section and the width Db of the second narrow width section of the pair of narrow width sections satisfy $0.8 \leqq Da/Db \leqq 1.2$.

5. The tire noise reduction device according to claim 2, wherein linear sections extending parallel to the longitudinal direction of the noise absorbing member are provided at positions mutually opposite the pair of narrow width sections, and a length of the linear sections is from 3 times to 30 times a thickness of the noise absorbing member.

6. The tire noise reduction device according to claim 1, wherein an outer peripheral length of the circular body is from 85% to 99% of a maximum inner peripheral length of the tread portion of the pneumatic tire.

7. The tire noise reduction device according to claim 1, wherein a laminated plurality of layers of the noise absorbing member are mutually secured using fasteners.

8. The tire noise reduction device according to claim 7, wherein a thickness of the fasteners when in a secured state is from 5% to 95% of a total thickness of the laminated plurality of layers of the noise absorbing member.

9. The tire noise reduction device according to claim 1, wherein the laminated plurality of layers of the noise absorbing member are mutually adhered.

10. The tire noise reduction device according to claim 1, wherein when the circular body is divided at 30 degree intervals from an arbitrary position on the periphery, a difference in mass of a pair of opposing divisions on either side of a center axis of the circular body is 10% or less with respect to a mass of a heavier division thereof.

11. The tire noise reduction device according to claim 1, wherein a density of the porous material forming the noise absorbing member is from 7 $kg/m^3$ to 40 $kg/m^3$, and a ratio of a tear strength (N/cm) to the density ($kg/m^3$) of the porous material is from 0.3 to 0.9.

12. A pneumatic tire comprising the tire noise reduction device according to claim 1 in a cavity portion.

13. The tire noise reduction device according to claim 4, wherein linear sections extending parallel to the longitudinal direction of the noise absorbing member are provided at positions mutually opposite the pair of narrow width sections, and a length of the linear sections is from 3 times to 30 times a thickness of the noise absorbing member.

14. The tire noise reduction device according to claim 5, wherein an outer peripheral length of the circular body is from 85% to 99% of a maximum inner peripheral length of the tread portion of the pneumatic tire.

15. The tire noise reduction device according to claim 6, wherein a laminated plurality of layers of the noise absorbing member are mutually secured using fasteners.

16. The tire noise reduction device according to claim 6, wherein the laminated plurality of layers of the noise absorbing member are mutually adhered.

17. The tire noise reduction device according to claim 9, wherein when the circular body is divided at 30 degree intervals from an arbitrary position on the periphery, a difference in mass of a pair of opposing divisions on either side of a center axis of the circular body is 10% or less with respect to a mass of a heavier division thereof.

18. The tire noise reduction device according to claim 10, wherein a density of the porous material forming the noise absorbing member is from 7 $kg/m^3$ to 40 $kg/m^3$, and a ratio of a tear strength (N/cm) to the density ($kg/m^3$) of the porous material is from 0.3 to 0.9.

19. A pneumatic tire comprising the tire noise reduction device according to claim 11 in a cavity portion.

20. The tire noise reduction device according to claim 2, wherein a width Da of a first narrow width section and a width Db of a second narrow width section of the pair of narrow width sections in relation to a maximum width D of the noise absorbing member satisfy $0.75 \leqq (Da+Db)/D \leqq 0.98$.

* * * * *